United States Patent Office 2,750,386
Patented June 12, 1956

2,750,386

PROCESS FOR THE PREPARATION OF NEW OXYTOCICALLY ACTIVE COMPOUNDS AND PREPARATIONS

Haaye Veldstra and Antony Marie Akkerman, Amsterdam, Netherlands, assignors to N. V. Amsterdamsche Chininefabriek, Amsterdam, Netherlands, a corporation of the Netherlands No Drawing. Application October 16, 1952,
Serial No. 315,826

Claims priority, application Netherlands October 17, 1951

10 Claims. (Cl. 260—293)

In the application in gynaecology of substances causing contraction of the uterus use has so far been made almost exclusively of the oxytocically active hormone of the posterior pituitary or of ergot alkaloids, preferably the water-soluble ergometrine. Up to the present not many details are known about synthetic oxytocics. Nevertheless, they are urgently needed, also in view of the increasing scarcity and the rising price of ergot.

Applicants have found that 3-(alkylpiperidyl-(N)-methyl) indoles have a strong oxytocic effect. These compounds can be conceived to be derived from 3-(piperidyl-(N)-methyl) indole by replacing in the piperidyl group one or more hydrogen atoms by alkyl groups.

These 3-(alkylpiperidyl-(N)-methyl) indoles have not so far been described in the literature, and are not known either. They can be prepared by different methods. One may, for example, react the alkyl piperidine in question with indole and formaldehyde; one may also heat equimolecular quantities of dimethylaminomethyl indole or diethylaminomethyl indole, respectively, with the alkyl piperidine in question. These preparation methods have been described for analogous compounds by Kuhn and Stein (Ber. 70, 567 (1937); compare also the German patent specification No. 673,949), and by Howe, Zambito, Snijder, and Tishler, J. Am. Chem. Soc. 67, 38 (1945), respectively.

The preparation of a number of compounds from this new series of the 3-(alkylpiperidyl-(N)-methyl) indoles will be elucidated below without the invention being restricted to these compounds or to the preparation method described in the examples.

EXAMPLE I

*3-(2'-methylpiperidyl-(N)-methyl) indole*

To 80 g. of α-pipecoline are added in drops, while cooling with ice, 81 cm.$^3$ of glacial acetic acid. After addition of 74 cm.$^3$ of formaline and 97 g. of indole, the mixture is thoroughly stirred. With considerable heat generation a slightly yellow oil is formed. After standing for 4 hours at room temperature, the reaction mixture is diluted with 1 litre of water and subsequently alkalized with ammonia. The gum separating off crystallizes rapidly.

The crude reaction product is filtered off by suction, washed with water, and dried in the air. After recrystallization from 400 cm.$^3$ of acetone, 142 g. of the pure compound with melting point 171–173° C. (dec.) are obtained.

EXAMPLE II

*3-(3'-methylpiperidyl-(N)-methyl) indole*

With 30 g. of β-pipecoline.HCl, 30 g. of sodium acetate.3 aq., 9 cm.$^3$ of glacial acetic acid, 20.2 cm.$^3$ of formaline, and 26.6 g. of indole, while proceeding further according to Example I, 33.6 g. of the pure reaction product are obtained, which, upon recrystallization from acetone, shows a melting point of 147–149° C.

EXAMPLE III

*3-(4'-methylpiperidyl-(N)-methyl) indole*

With γ-pipecoline.HCl as starting product and further the same quantities of reaction components as in Example II, 44 g. of the desired product are obtained, which, upon recrystallization from ligroin-ether, shows a melting point of 108–109° C.

EXAMPLE IV

*3-(2'-4'-dimethylpiperidyl-(N)-methyl) indole*

60 g. of 2,4-dimethylpiperidine.HCl (melting point 185–188° C.) are mixed with 55 g. of pulverized sodium acetate.3 aq., 16 cm.$^3$ of glacial acetic acid, and 37 cm.$^3$ of formaline, after which 47 g. of indole are added. After renewed stirring, the mixture grows warm fairly rapidly. After 30 minutes' stirring, it is diluted with 80 cm.$^3$ of methyl alcohol, and the mixture is heated some time longer. Upon standing, the reaction product separates off in the crystalline form; the whole is diluted with water, and made ammoniacal, after which the base is shaken out with ether.

From this, a slowly crystallizing syrup is obtained. Recrystallization of the substance from ligroin (90–100° C.) yields 90 g. of pure compound with melting point 104–106° C.

EXAMPLE V

*3-(2'.6'-dimethylpiperidyl-(N)-methyl) indole*

With 2.6-dimethylpiperidine.HCl (melting point 288–291° C.) as starting product and further the same quantity of reaction components as in Example IV, 36 g. of the pure compound are obtained, which, upon recrystallization from benzene, shows a melting point of 113–114° C.

EXAMPLE VI

*3-(2'.4'.6'-trimethylpiperidyl-(N)-methyl) indole*

With 68.5 g. of 2.4.6-trimethylpiperidine.HCl (melting point 310–314° C.), 45 g. of sodium acetate.3 aq., 13 cm.$^3$ of glacial acetic acid, 30 cm.$^3$ of formaline, 38.5 g. of indole, and further the same reaction conditions and method as in Examples IV and V, 40.5 g. of this compound are obtained, which, upon recrystallization from ligroin, shows a melting point of 111–112° C.

EXAMPLE VII

*3-(2'-ethylpiperidyl-(N)-methyl) indole*

With 23 g. of 2-ethylpiperidine, 20.4 cm.$^3$ of glacial acetic acid, 18.7 cm.$^3$ of formaline, and 24.5 g. of indole, the other conditions being the same as in Example I, 30 g. of the pure reaction product are obtained, after recrystallization from alcohol. Melting point 160–161° C.

EXAMPLE VIII

*3-(2'-n-propylpiperidyl-(N)-methyl) indole*

Again with the same method as in Example I, from 25 g. of 2-n-propylpiperidine, 19.2 cm.$^3$ of glacial acetic acid, 17.6 cm.$^3$ of formaline, and 23 g. of indole, are obtained 43 g. of the pure final product, after recrystallization from ligroin. Melting point 97–99° C.

EXAMPLE IX

*3-(4'-ethylpiperidyl-(N)-methyl) indole*

80 g. of 4-ethylpiperidine, 71 cm.$^3$ of glacial acetic acid, 65 cm.$^3$ of formaline, and 85 g. of indole, according to the method of Example I, yield 110 g. of the crude product, from which 82 g. of the pure compound with a melting point of 121–122° C. are obtained, after recrystallization from acetone.

EXAMPLE X

*3-(2'-methyl-5'-ethylpiperidyl-(N)-methyl) indole*

80 g. of 2-methyl-5-ethylpiperidine.HBr (melting point 170–172° C.), 52.3 g. of sodium acetate.3 aq., 15 cm.³ of glacial acetic acid, 35 cm.³ of formaline, and 45 g. of indole, according to the method of Example IV, yield 85 g. of the crude product. By recrystallization from ligroin there are obtained 74 g. of the pure compound with a melting point of 103–104° C.

The oxytocic effect of these compounds, used in the form of their salts, is compared with that of ergometrine on the uterus of the rabbit in situ, sensibilized with oestrone. If we put the effect of ergometrine at 1, the following is found, for example, with regard to the methyl compounds.

3-(2',4',6'-trimethylpiperidyl-(N)-methyl) indole has an effect of 0.25;

3-(2',4'-dimethylpiperidyl-(N)-methyl) indole has an effect of 0.33;

3-(2'-methylpiperidyl-(N)-methyl) indole has an effect of 0.50;

3-(2',6'-dimethylpiperidyl-(N)-methyl) indole has an effect of 0.63.

On the whole it appears that when the piperidyl group carries alkyl groups in the position 2, and particularly in both the positions 2 and 6, the compound has a very strong oxytocic effect. This holds in particular when the alkyl groups are methyl groups. All the same, compounds such as 3-(4'-ethylpiperidyl-(N)-methyl) indole and 3-(2'-methyl-5'-ethylpiperidyl-(N)-methyl) indole are also active, though not to such a high degree as the above-mentioned methyl compounds, at least in so far as their effect on the uterus in situ is concerned; the two latter compounds, however, have a similarly strong effect on the isolated uterus as the above-mentioned methyl compounds.

The new compounds according to the invention are preferably used in the form of their salts, such as the hydrochloride or the maleate. It is to be noted that ergometrine is mainly used in the form of a maleate, and not as a hydrochloric acid salt. The compounds or their salts can be made into tabloids, for example, together with the usual fillers for tabloids, such as lactose, amylum, talcum, magnesium stearate. They can also be readily dissolved in water in the form of their salts, as a result of which preparations suitable for injection are obtained after sterilization. For this, pyrogen-free water is preferably used.

What we claim is:

1. As an oxytocically active substance a member of the group consisting of 3-(alkylpiperidyl-(N)-methyl)-indoles and their acid addition salts, said indoles having the formula:

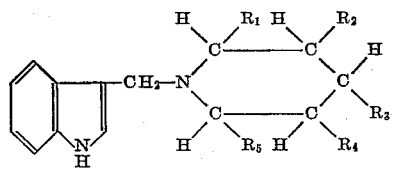

wherein $R_1$ to $R_5$ inclusive each represent a member of the group consisting of hydrogen and lower alkyls containing not more than five carbon atoms, and wherein not more than three of $R_1$ to $R_5$, inclusive, represent said lower alkyls.

2. As an oxytocically active substance a compound as set forth in claim 1, in which $R_1$ is methyl.

3. As an oxytocically active substance a compound as set forth in claim 1, in which $R_1$ is methyl and $R_2$ to $R_5$ inclusive represent hydrogen atoms.

4. As an oxytocically active substance a compound as set forth in claim 1, in which $R_1$ and $R_3$ are methyl, and $R_2$, $R_4$ and $R_5$ represent hydrogen atoms.

5. As an oxytocically active substance a compound as set forth in claim 1, in which $R_1$ and $R_5$ are methyl groups, and $R_2$ to $R_4$ inclusive represent hydrogen atoms.

6. As an oxytocically active substance a compound as set forth in claim 1, in which $R_1$, $R_3$ and $R_5$ are methyl groups, and $R_2$ and $R_4$ represent hydrogen atoms.

7. As an oxytocically active substance a compound as set forth in claim 1, in which $R_1$ is methyl, $R_4$ is ethyl and $R_2$, $R_3$ and $R_5$ represent hydrogen atoms.

8. As an oxytocically active substance an acid addition salt as set forth in claim 1, in which the acid is hydrochloric acid.

9. As an oxytocically active substance an acid addition salt as set forth in claim 1, in which the acid is maleic acid.

10. The process of making 3-(alkylpiperidyl-(N)-methyl)-indoles having the formula:

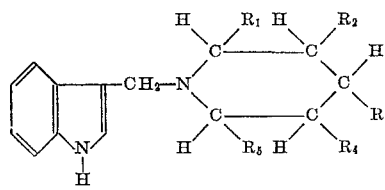

wherein $R_1$ to $R_5$ inclusive each represent a member of the group consisting of hydrogen and lower alkyls containing not more than five carbon atoms, and wherein not more than three of $R_1$ to $R_5$, inclusive, represent said lower alkyls, which consists in reacting a substituted piperidine of the formula:

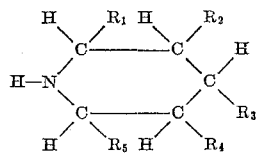

wherein $R_1$ to $R_5$ inclusive have the above defined meaning, with unsubstituted indole and formaldehyde, and recovering said indoles therefrom.

References Cited in the file of this patent

FOREIGN PATENTS 673,949    Germany   ------------ Mar. 31, 1939

OTHER REFERENCES

Craig et al.: JACS, vol. 71, pp. 462–65 (1949).

Brehm et al.: J. Org. Chem., vol. 15 (3), pp. 685–87 (1950).

Akkerman et al.: Recueil des Travaux Chimiques, vol. 70, pp. 899–916, (November 1951).